No. 689,481. Patented Dec. 24, 1901.
A. GADE.
STONE MASON'S HAMMER.
(Application filed July 12, 1901.)
(No Model.)
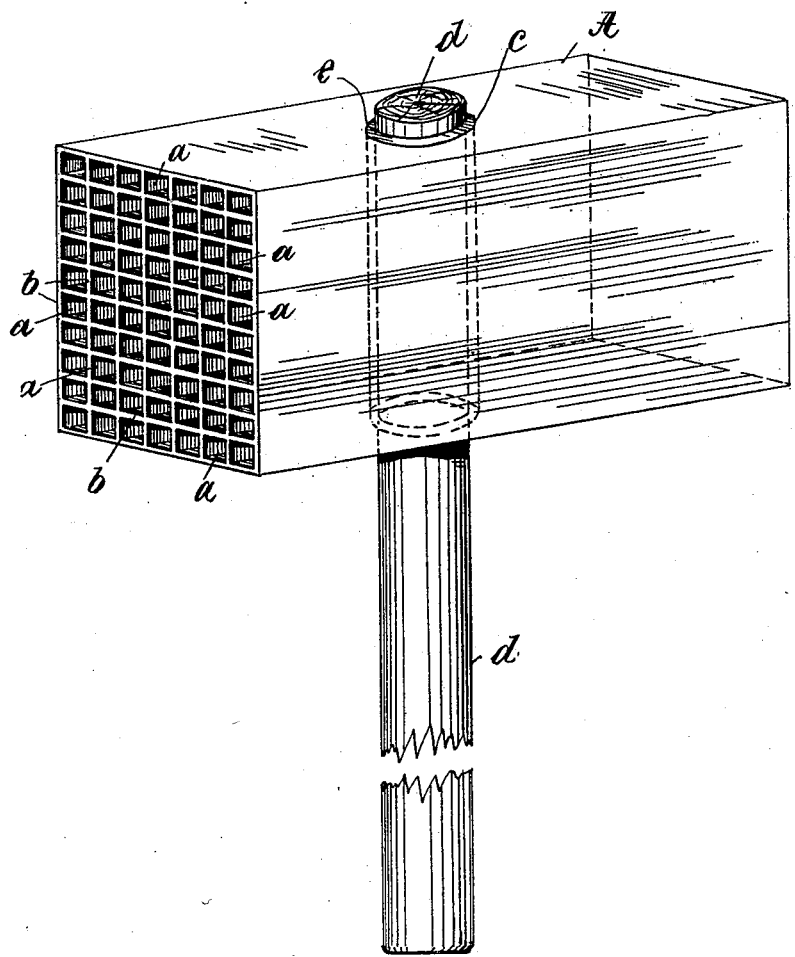

UNITED STATES PATENT OFFICE.

ALBERT GADE, OF DROSSEN, GERMANY.

STONE-MASON'S HAMMER.

SPECIFICATION forming part of Letters Patent No. 689,481, dated December 24, 1901.

Application filed July 12, 1901. Serial No. 68,067. (No model.)

*To all whom it may concern:*

Be it known that I, ALBERT GADE, stone-cutter, residing at Drossen, Prussia, in the Empire of Germany, have invented Improvements in Stone-Masons' Hammers, of which the following is a specification.

The present invention relates to a new granulating-hammer for facing the surface of granite, marble, sandstone, and similar surfaces.

Facing-hammers as generally employed rapidly become blunt and ineffective and require continual resharpening in order to maintain them in a serviceable condition. My new hammer, on the contrary, does not blunt, and therefore requires no such subsequent sharpening. This result is obtained through a new construction of the hammer-head.

Prior granulating-hammers comprise a head composed of solid metal, on the working surface of which teeth or cutting edges are formed by filing, countersinking, or the like; or in some cases the teeth or cutting edges are made of removable strips separately from the head proper and secured to the face of the latter. My new hammer, on the other hand, differs from such constructions in that the head contains, essentially, a number of longitudinally-running channels the extremities or ends of the walls of which form the teeth or cutting edges.

My new invention is illustrated by the annexed drawing, in which the figure shows a perspective view of the improved hammer.

The hammer-head A instead of being formed of a solid piece of metal contains a group of channels $a$, separated by partition-walls $b$. The channels may be of any desired cross-section and run at right angles to the working face throughout the whole length of the head. The ends of the partition-walls $b$ form the teeth or cutting edges of the hammer. The eye $c$ for the helve $d$ may receive a socket of sheet metal $e$ for the purpose of preventing undue wear of the end of the wooden helve.

My new hammer may be manufactured in the ordinary manner. For example, the metal employed may be crucible cast-steel cast in any suitable mold and then rolled on the well-known tube-rolling system.

For working granite the walls $b$, if about one or one and one-half millimeters thick, will be found to afford a sufficiently sharp edge. For marble and sandstone the walls should be somewhat thinner.

In the drawing channels of square cross-section are shown; but I do not confine myself to such precise form nor to any definite number of channels nor to the particular shape of hammer-head shown.

Having now described my invention, I claim as new and desire to secure by Letters Patent—

A hammer comprising a head containing a number of longitudinal channels running at right angles to the working face, the ends of the walls dividing said channels forming cutting edges or teeth, substantially as and for the purpose hereinbefore set forth.

In testimony that I claim the foregoing as my invention I have signed my name in presence of two subscribing witnesses.

ALBERT GADE.

Witnesses:
   WOLDEMAR HAUPT,
   HENRY HASPER.